United States Patent

Memmel et al.

[11] Patent Number: 4,728,229
[45] Date of Patent: Mar. 1, 1988

[54] POSITIONING MECHANISM FOR A MULTIPLE HEAD DRILLING ASSEMBLY

[75] Inventors: Lawrence C. Memmel, Mequon; Donald E. Thiede, Hartland, both of Wis.

[73] Assignee: Super Tool and Mfg. Corporation, Brookfield, Wis.

[21] Appl. No.: 804,830

[22] Filed: Dec. 5, 1985

[51] Int. Cl.⁴ .............................................. B23B 39/18
[52] U.S. Cl. ........................................ 408/46; 408/53; 408/88; 409/209; 409/217
[58] Field of Search ....................... 408/1, 2, 3, 11, 16, 408/26, 88, 46, 103; 29/26 A; 409/209, 212, 217

[56] References Cited

U.S. PATENT DOCUMENTS

| | | | |
|---|---|---|---|
| 3,501,982 | 3/1970 | Haley | 77/24 |
| 3,529,496 | 9/1970 | Haley | 77/24 |
| 3,583,054 | 6/1971 | Hughes | 29/26 A |
| 3,682,560 | 8/1972 | Suizu | 408/46 |
| 3,749,507 | 7/1973 | Haley | 408/46 |
| 3,794,435 | 2/1974 | Haley | 408/59 |
| 3,822,958 | 7/1974 | Lewis | 408/46 |
| 4,023,672 | 5/1977 | Haley | 198/35 |
| 4,080,740 | 3/1978 | Haley | 33/174 |
| 4,090,803 | 5/1978 | Haley | 408/46 |
| 4,090,804 | 5/1978 | Haley | 408/59 |
| 4,168,056 | 9/1979 | Haley | 266/58 |

FOREIGN PATENT DOCUMENTS

| | | | |
|---|---|---|---|
| 4026 | 8/1912 | United Kingdom | 408/53 |
| 991331 | 5/1965 | United Kingdom | 408/2 |

*Primary Examiner*—Z. R. Bilinsky
*Attorney, Agent, or Firm*—Andrus, Sceales, Starke & Sawall

[57] ABSTRACT

A mechanism for individually positioning a drilling head in a multiple head drilling assembly. The assembly includes a plurality of spindle blocks arranged in side-by-side relation, and a spindle that is adapted to carry a drill head is mounted for rotation and axial movement in each block. Each spindle block is mounted for individual lateral movement in a direction normal to the axis of the spindle on guide rods, and is driven laterally by a rotatable lead screw that extends parallel to the guide rods. A recirculating ball nut is associated with each spindle block and is engaged with the lead screw. A clamping mechanism acts to selectively clamp each nut to the respective spindle block and by clamping the nut to the block, the spindle block will be moved along the guide rods on rotation of the lead screw, and by disengaging the nut from the respective spindle block, rotation of the lead screw will cause free rotation of the nut without movement of the block. With this construction, each spindle block can be selectively and individually positioned for the drilling operation.

18 Claims, 7 Drawing Figures

POSITIONING MECHANISM FOR A MULTIPLE HEAD DRILLING ASSEMBLY

BACKGROUND OF THE INVENTION

In the fabrication of structural members, such as wide flange beams, channels, angles, tube and plate it is necessary to drill holes at specified positions in the various surfaces of the members and the location of the holes will vary from piece-to-piece. To automate the drilling operation, multiple head drilling machines have been developed. Machines of this type are generally composed of an upper spindle assembly and a pair of side spindle assemblies. Each assembly carries one or more drill heads that can be positioned to drill holes at desired locations in the web and flanges, or other surfaces of the structural member as the member is fed through the machine.

In the conventional multiple head drilling machine the drilling heads are each carried by a spindle which is mounted for rotation, as well as for axial movement in a spindle block, and one or more spindle blocks are mounted in parallel relation in the assembly. In the past, for each run it was necessary to disassemble the assembly of spindle blocks and manually reposition the spindle blocks in the desired location for the next succeeding run.

To eliminate the manual labor involved in setting up the spindle block assembly, systems have been developed in which the spindle blocks in each assembly are connected to a lead screw, so that rotation of the screw in one direction will move the blocks and spindles toward each other, while rotation of the lead screw in the opposite direction will move the blocks spindles away from each other. A second lead screw, or screws, moves a given group of spindle blocks simultaneously as a set in one direction or another. However, machines of this type have no provision for individually and automatically moving each spindle block.

SUMMARY OF THE INVENTION

The invention is directed to a multiple head drilling machine and more particularly to a mechanism for selectively positioning the drilling heads, either individually or simultaneously as a group, in a spindle block assembly. In accordance with the invention, the assembly is composed of a group of spindle blocks that are mounted in generally parallel relation. A spindle is mounted for rotation, as well as being mounted for axial movement, in each block, and each spindle carries a drill head.

The blocks are mounted for movement in a direction perpendicular to the axis of the spindle on a pair of guide rods and a rotatable lead screw is located parallel to the guide rods and extends through openings in the blocks. Mounted in the opening in each spindle block is a recirculating ball nut which is engaged with the lead screw. Enclosing the outer surface of the recirculating ball nut, is a plastic sleeve having an outer cylindrical surface, providing a brake lining characteristic, and a clamping mechanism associated with the block acts to selectively clamp each nut to the respective block. By clamping the nut to the block, the block will be moved along the guide rods on rotation of the lead screw and by disengaging the nut from the block, rotation of the lead screw, will cause free rotation of the nut at the identical speed of the screw without corresponding movement of the spindle block.

With this construction, each slide block and spindle can be moved individually to position the drill head, or position a group of spindles, simultaneously at a desired location relative to the structural member or workpiece requirement.

The clamping mechanism provides a positive lock between the nut and the spindle block without deflection of the lead screw. The clamping mechanism includes a pair of curved clamping members or pads that are arranged to engage opposite portions of the sleeve that surrounds the recirculating ball nut. One of the clamping members is connected to the ram of a fluid cylinder, which is mounted for sliding movement in the spindle block so that the clamping member can be moved radially toward and away from the nut. The other clamping member is connected to the cylinder and is mounted for sliding movement relative to the spindle block. To clamp the nut to the block, the ram of the fluid cylinder is extended to bring the first clamping member into engagement with the outer periphery of the sleeve on the nut, and continued operation of the fluid cylinder will then cause the cylinder to move relative to the ram to bring the second clamping member into engagement with the nut sleeve at a diametrically opposite location and firmly clamp the nut to the spindle block.

The invention also includes a mechanism for spacing the clamping members out of contact with the nut when the clamping members are in the released position, so that the nut can freely rotate without frictional contact with the clamping members.

With the positioning mechanism of the invention, any number of spindle blocks can be associated in the assembly and the spindle blocks can be positioned as close as 3 inches or 75 mm on center for the drilling operation.

The invention also incorporates an improved cooling system for the drill head. The spindle is provided with a longitudinal passage which is connected to a supply of coolant, and a collet which is received within a recess in the distal end of the spindle has a pair of passages which communicate with the passage in the spindle and serve to discharge the coolant directly toward the drill point.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
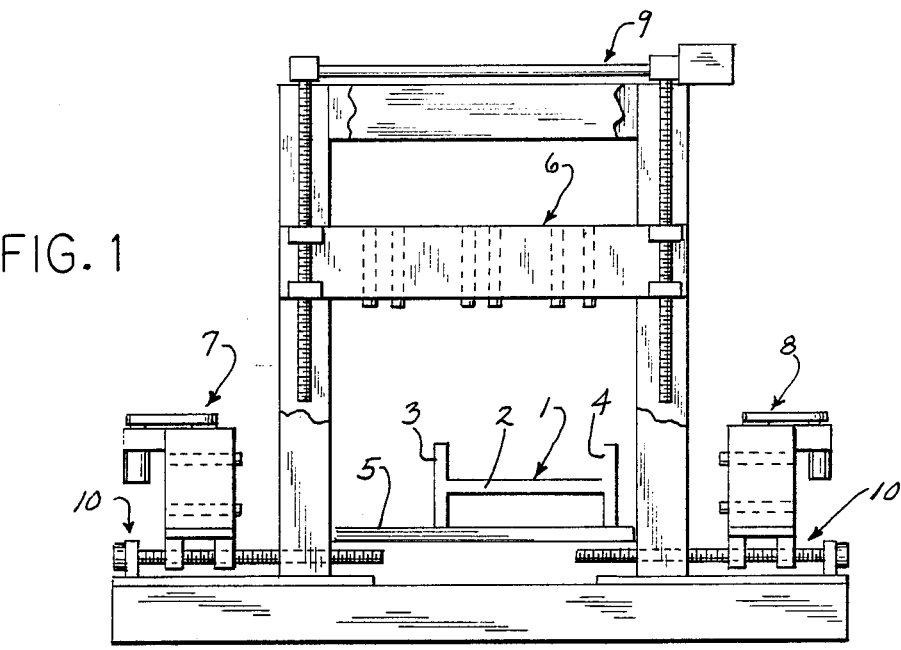
FIG. 1 is a schematic representation of the drilling apparatus of the invention.

The drawings illustrate a machine for performing a working function on a structural member and in particular the machine can be employed to drill holes in a steel wide flange beam 1. As shown schematically in FIG. 1, the wide flange beam 1, composed of central web 2 and a pair of flanges 3 and 4, is fed through the machine on a plurality of parallel support rollers 5.

The machine, in general, includes an upper spindle assembly 6 that carries a series of drilling heads adapted to drill holes at specified locations in the web 2 of beam 1 and a pair of side multiple spindle assemblies 7 and 8 which are adapted to drill holes at selected locations in the flanges 3 and 4, respectively.

The upper multiple spindle assembly 6 can be moved vertically toward and away from the beam by a conventional drive screw mechanism indicted generally by 9, and similarly the side assemblies 7 and 8 can be moved horizontally toward and away from the flanges 3 and 4 by conventional drive screw mechanisms 10.

Each of the spindle assemblies 6-8 are generally similar in structure and, therefore, the description will be directed to the construction of the upper assembly 6.

The assembly includes a generally rectangular supporting structure or frame 14 and a plurality of spindle blocks 15 are mounted in parallel relation in frame 14 and are guided in movement within the frame by a pair of guide rods 16 which extend through bushings 17 in the blocks 15.

Each block 15 can be locked in position relative to frame 14 and the locking mechanism includes a clamping block 18 which extends inwardly from each side plate 19 of frame 14 and is received within a generally rectangular recess 20 in the side edge of the block 15. A pair hydraulic cylinders 21 are mounted on the upper surface of each block 15 and the rams 22 of cylinders 21 extend downwardly through openings 23 and each ram carries a fibrous clamping pad 24. By extending the ram 22, pads 24 will be moved downwardly into engagement with the upper surfaces of the respective clamping blocks 18 to thereby clamp or lock the spindle blocks in position relative to the frame 14.

Each block 15 carries a spindle 25 and the spindle is journalled for rotation within a generally cylindrical quill 26 by an upper bearing 27 and a pair of lower bearings 28. Quill 26 is secured to block 15 by key 29.

Figure 3:
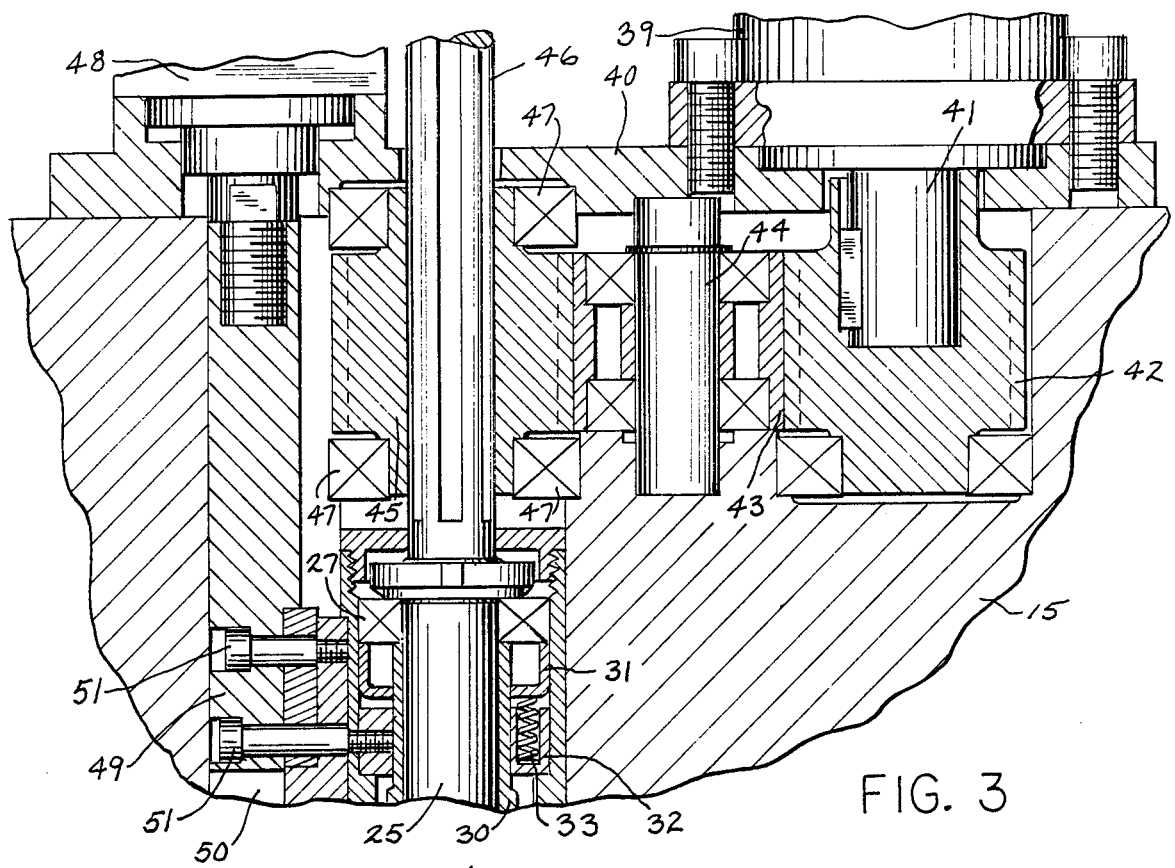
FIG. 3 is an enlarged sectional view showing the mechanism for rotating and moving the spindle axially.

As best illustrated in FIG. 3, a spacer sleeve 30 is positioned around the spindle 25 and extends between the upper bearing 27 and the lower bearings 28. A ring 31 is disposed in engagement with the upper bearing 27 while a spring retainer 32 is secured to quill 26 and a series of springs 33 are mounted within openings in retainer 32 and are interposed between the ring 31 and the spring retainer. Springs 33 serve to compensate for heat expansion and maintain a constant tension on the bearings 27 and 28.

Figure 2:
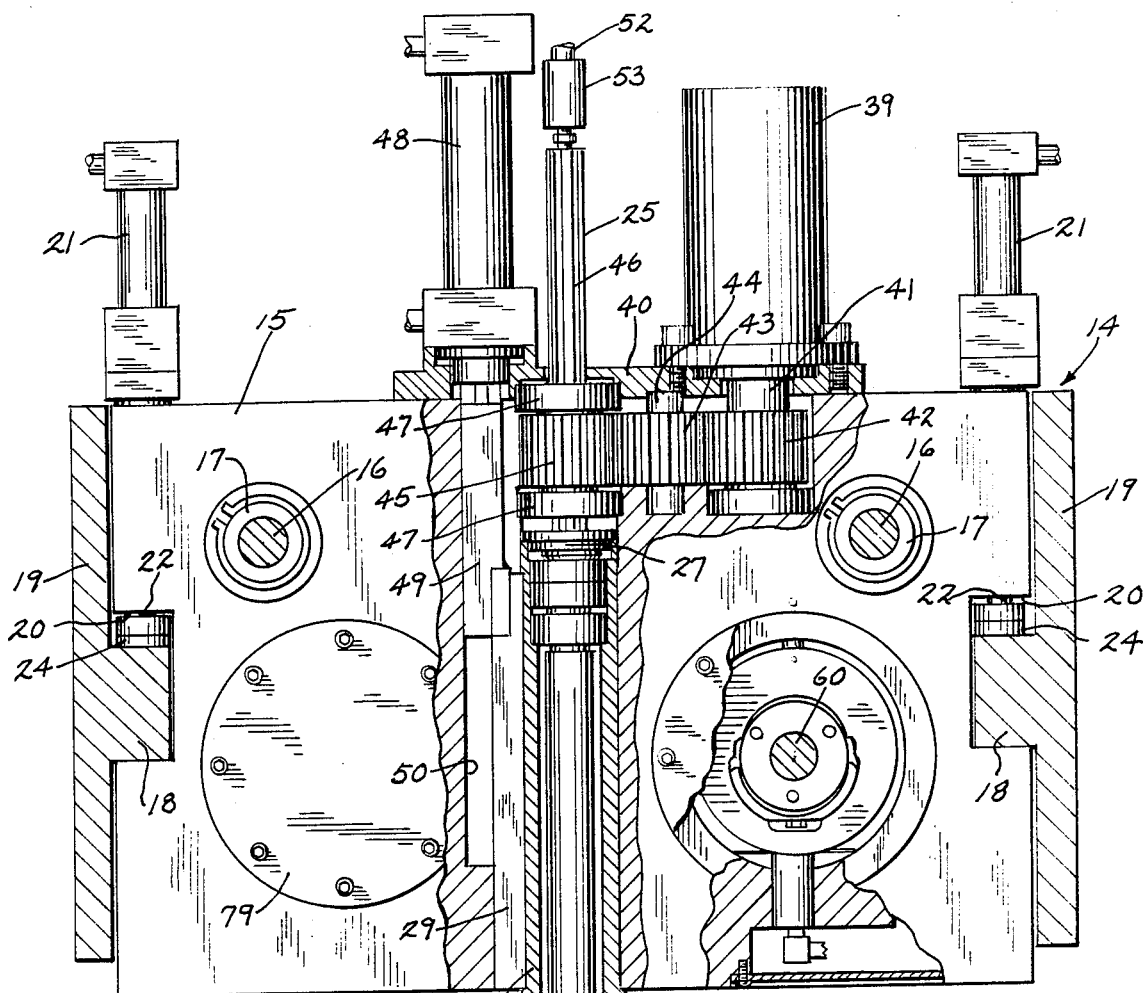
FIG. 2 is a plan view of a slide block with parts broken away in section.
Figure 4:
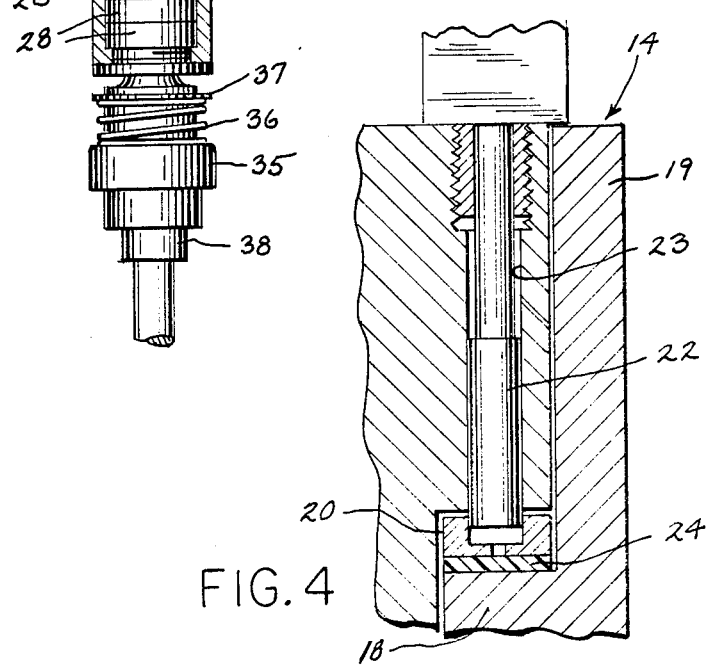
FIG. 4 is an enlarged fragmentary section showing the mechanism for locking the spindle block to the frame.

As illustrated in FIG. 2, the lower end of the spindle 25 projects outwardly from block 15 and carries a standard quick release coupling assembly that includes a collar 35, which is urged downwardly by a spring 36 that is positioned between the collar and a ring 37 mounted on the end of the spindle. A collet 38 is mounted within a recess in the lower end of the spindle and the upper end of a drill head is adapted to be received within the collet and held therein by the collar 35.

To rotate the spindle 25 about its axis, a motor 39 is mounted on a plate or cap 40 secured to the upper surface of each block 15. The drive shaft 41 of motor 39 carries a gear 42 which meshes with a gear 43 mounted on shaft 44 that is carried by plate 40. Gear 43, in turn, engages a gear 45 which is splined to the upper end 46 of spindle 25. Gear 45 is journalled through bearings 47 connected to the spindle block 15 and plate 40, respectively. With this gear train, rotation of the drive shaft 41 will be transmitted through gears 42, 43 and 45 to rotate spindle 25 about its axis.

To move the spindle 25 and drill head axially relative to the spindle block 15, a cylinder 48 is mounted on plate 40 and ram 49, which is slidable in cylinder 48, extends downwardly into a recess 50 in spindle block 15. The end of ram 49 is connected through bolts 51 to key 29. By extending and retracting ram 49, quill 26 and spindle 25 will be moved axially to correspondingly move the drill head toward and away from the wide flange beam 1.

Figure 7:
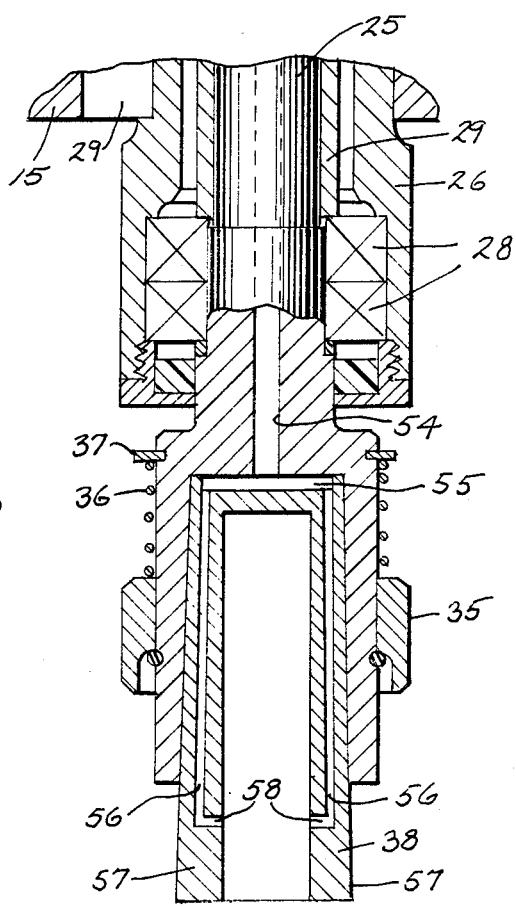
FIG. 7 is an enlarged section showing the attachment of the collet to the spindle and the cooling passages.

During the drilling operation, a liquid coolant is applied to the drill head. In this regard, a coolant supply line 52, which is connected to a source of coolant, is connected through coupling 53 to an axial passage 54 in spindle 25. As shown in FIG. 7, the lower end of passage 54 communicates with a recess 55 formed in the upper end of collet 38 and passages 56 communicate with recess 55 and extend downwardly through the legs 57 of the collet. The lower ends of passages 56 communicate with cross passages 58 which extend to the interior of the collet. With this cooling system, the coolant will be supplied through the interior of the spindle 25 and through passages 55,56 and 58 in the collet to the drill point during the drilling operation thereby eliminating the use of inducer sleeves and hoses in the drilling area.

In accordance with the invention, each spindle block 15 can be selectively moved, either individually or in a group, along guide rods 16 to position the drill heads in the desired location for drilling holes in the beam 1. To supply this selective movement, a lead screw 60 is disposed parallel to guide rod 16 and extends through aligned openings 61 in the spindle blocks 15.

A conventional recirculating ball nut 62 is mounted in the opening in block 15 and is engaged with the lead screw 60. Nut 62 is provided with one or more external channels 63 which serve as passages for the recirculation of the ball bearings.

Figure 6:
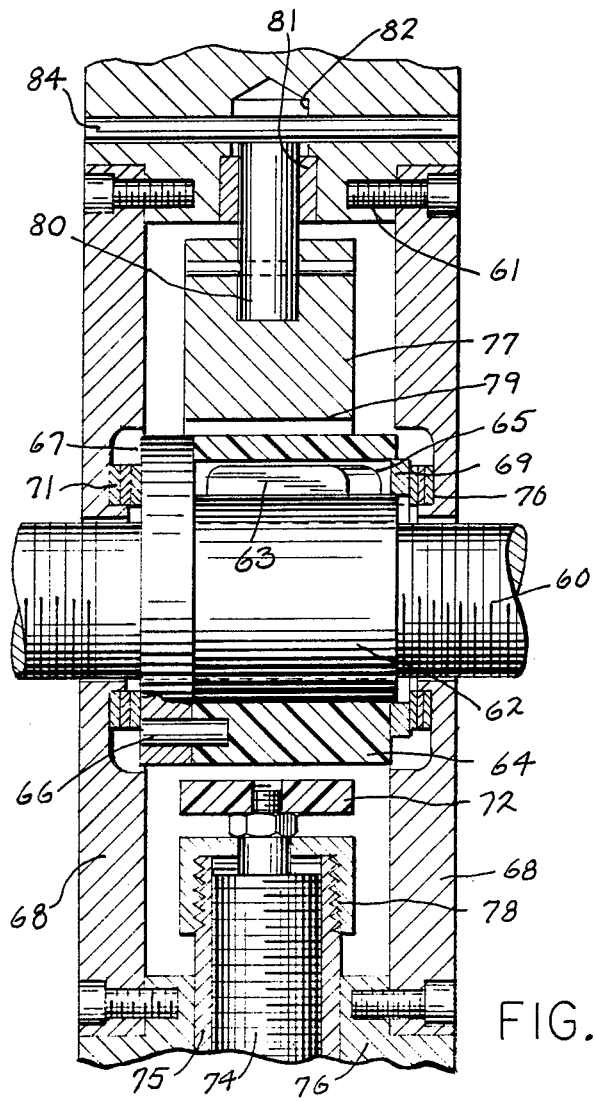
FIG. 6 is a section taken along line 6—6 of FIG. 5.

Positioned around the outer surface of nut 62 is a plastic sleeve 64 formed of phenolic resin, or the like. As shown in FIG. 6, sleeve 64 is molded with a cavity 65 to receive the channels 63, and a plurality of pins 66 serve to attach sleeve 64 to the flange 67 of nut 62. The outer surface of sleeve 64 is generally cylindrical and has the physical characteristics of a brake lining.

The lead screw 60 is rotated by a servo motor mounted on the frame 14 of the assembly, and not shown.

Annular caps 68 are secured to opposite faces of each spindle block 15 and enclose the ends of nuts 62. As shown in FIG. 6, each cap is provided with a central opening to receive the screw 60.

As shown in FIG. 6, a metal spacer ring 69 is mounted in a groove in the end of plastic sleeve 64 and a thrust bearing assembly 70 is interposed between spacer ring 69 and the corresponding cap 68. A second thrust bearing assembly 71 is located between the head of nut 62 and the corresponding cap 68.

Figure 5:
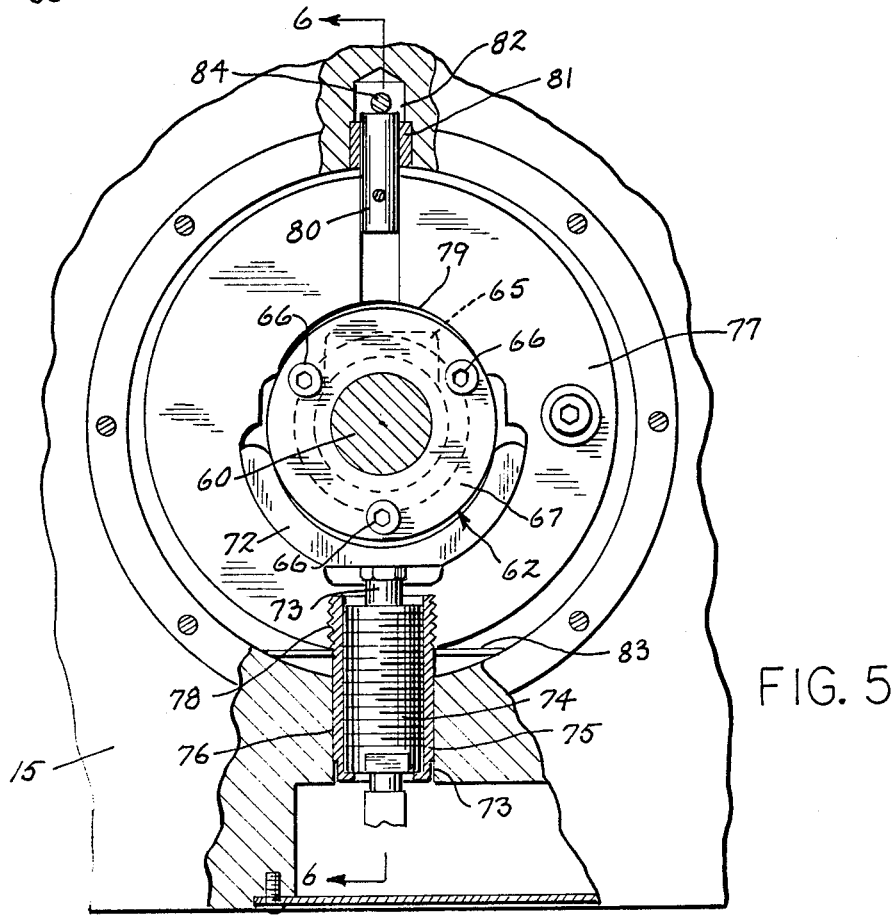
FIG. 5 is an enlarged section showing the construction of the lead screw and nut.

In accordance with the invention, a clamping mechanism is employed to selectively clamp the nut 62 to the respective spindle block 15. The clamping mechanism includes a generally arcuate clamping pad 72, as shown in FIG. 5, which is connected to the end of a piston rod 73 that is slidable within fluid cylinder 74. The outer surface of cylinder 74 is threaded and is engaged with the internal thread of a sleeve 75 that is mounted for sliding movement within opening 76 in spindle block 15. By introducing fluid into one end of the cylinder 74, piston rod 73 will be extended to bring the pad 72 into engagement with the periphery of sleeve 64 on nut 62.

The clamping mechanism also includes a generally circular clamp or pad 77. As shown in FIG. 5, the pad 77 is provided with a radial tapped opening 78 and sleeve 75 is threaded in the opening. Pad 77 is provided with a generally curved clamping surface 79 located diametrically opposite the clamping pad 72 and which is adapted to engage sleeve 64 on nut 62.

To mount pad 77 for sliding movement relative to block 15, pad 77 carries a pin 80 which is located in direct alignment with the axis of cylinder 74 and the pin is mounted for sliding movement within a bushing 81 mounted in a recess 82 in spindle block 15.

In the released position shown in FIG. 5, the clamping pads 72 and 77 are out of contact with sleeve 64 on nut 62 and rotation of the lead screw will therefore not result in movement of the slide block 15 along guide rods 16.

To maintain the upper clamping pad 77 out of contact with sleeve 64 when the clamping pads 72 and 77 are in the released position, a metal spring 83 is mounted in the lower end of the cavity in block 15 and is engaged with the lower end of clamping pad 77, as shown in FIG. 5. The force of spring 83 urges the pad 77 upwardly out of contact with sleeve 64 and the upward biasing action is limited by engagement of pin 80 with a cross pin 84 that is mounted in an opening in block 15.

If it is desired to change the position of the spindle block 15, the nut 62 is clamped to the spindle block by introducing fluid into the cylinder 74, causing the pad 72 to move into engagement with the outer surface of sleeve 64. The continued stroke of the cylinder will then cause the cylinder 74 to move relative to piston rod 73 and pad 72, and as the cylinder 74 is secured to pad 77, movement of the cylinder will bring the surface 79 into engagement with the opposite side of the sleeve 64, thereby firmly clamping the nut 62 to the spindle block 15. In this condition the nut will be firmly clamped to the spindle block without any possibility of deflection of the lead screw 60. With nut 62 clamped to block 15, rotation of screw 60 will cause movement of block 15 along guide rods 16 to the desired position.

To release the clamping action, piston rod 73 is retracted causing lower clamping pad 72 to move out of engagement with sleeve 64, and the biasing force of spring 83 will move the upper clamping pad 77 upwardly out of contact with sleeve 64 so that the nut can rotate freely relative to the clamping pads.

Through automated controls, each spindle block 15 and spindle 25 can be selectively and individually moved in the assembly to position the drill head at the precise location for the drilling operation. After the spindle block has been properly positioned, cylinders 21 are actuated to clamp the pads 24 against clamping block 18 on the frame, to thereby lock or hold the spindle block in the desired position.

With the side assemblies 7 and 8, it may be desirable to utilize a pair of lead screws 60 and in this case a pair of nuts 62 would be associated with each spindle block. In order that the spindle blocks 15 can be utilized either in the top assembly 6 or the side assembly 7 and 8, the spindle blocks can be provided with a pair of openings 61. When the spindle block 15 is used in the upper assembly 6, only a single opening 61 and nut 62 are utilized and thus dummy covers 85 can be used to enclose the second opening 61 that is not utilized. When the spindle block 15 is employed in the side assemblies 7 and 8, a pair of lead screws 60 are utilized and a nut 62 is mounted within each of the openings 61 in the spindle block.

The plastic sleeve 64 provides a smooth cylindrical outer surface for the nut 62, having the physical characteristics of a brake lining, to receive the clamping mechanism. In addition, the plastic material is of light weight and will minimize the flywheel effect that could accompany the use of a heavier rotating metal sleeve.

Any number of spindle blocks 15 can be incorporated in the assemblies 6, 7, and 8. In practice, when drilling wide flange beams, as many as six spindle blocks can be associated with upper assembly 6, while two or more spindle blocks can be incorporated with each of the side assemblies 7 and 8. As the spindle blocks 15 are relatively narrow, the spindles 25 can be as close as 3 inches on center.

Various modes of carrying out the invention are contemplated as being within the scope of the following claims particulary pointing out and distinctly claiming the subject matter which is regarded as the invention.

We claim:

1. A positioning apparatus for positioning a head of a multiple head working apparatus, comprising a frame, a plurality of spindle blocks mounted in side-by-side relation on the frame, guide means for guiding the spindle blocks in movement on said frame in a given direction, a spindle to carry a working member and connected to each spindle block, means for rotating each spindle about its axis means for moving each spindle axially relative to the respective block, screw means extending in said direction, nut means associated with each spindle block, each nut means being threadedly engaged with said screw means, and clamping means for selectively clamping each nut means to the respective spindle block, whereby rotation of the screw means when the nut means is engaged with the respective spindle block will cause movement of the spindle block in said direction and rotation of said screw means when said nut means is disengaged with said spindle block will not cause movement of said spindle block.

2. The apparatus of claim 1, wherein said screw means comprises a lead screw and said nut means comprises a recirculating ball nut having external recirculation channels, said nut means also including an outer jacket secured to said nut, said clamping means disposed to engage the outer surface of said jacket.

3. The apparatus of claim 2, wherein said jacket is composed of plastic material having brake lining characteristics and has a cylindrical outer surface.

4. The apparatus of claim 2, wherein said jacket has an internal cavity to receive said recirculation channels.

5. The apparatus of claim 1, and including locking means for releasably securing each block to the frame.

6. The apparatus of claim 5, wherein said locking means comprises a fluid cylinder mounted on said block and a piston rod slidable within said cylinder, a clamp pad secured to said piston rod, and a clamping block secured to said frame and disposed to be engaged by said clamping pad on actuation of said cylinder to thereby clamping said block to said frame.

7. The apparatus of claim 1, wherein each spindle block is generally rectangular in shape and said guide means comprises a pair of guide rods, each guide rod extending through aligned openings in said spindle blocks.

8. The apparatus of claim 1, wherein said clamping means is carried by said block.

9. The apparatus of claim 1, wherein said clamping means includes a pair of clamping members connected to said spindle block and movable between a clamping position wherein said clamping members engage the nut means and a release position, and means for maintaining said clamping members out of contact with said nut means when said clamping members are in the release position so that the nut means can rotate freely with respect to said clamping members.

10. A positioning apparatus for positioning a head of a multiple head working apparatus, comprising a frame, a plurality of spindle blocks mounted in side-by-side relation on the frame, guide means for guiding the spindle blocks in movement on said frame in a given direction, a spindle to carry a working member and connected to each spindle block, means for rotating the spindle about its axis, means for moving the spindle axially relative to said block, screw means extending in said direction, nut means associated with each spindle block and engaged with said screw means, and clamping means for selectively clamping each nut means to the respective spindle block, whereby rotation of the screw means when the nut means is engaged with the respective spindle block will cause movement of the spindle block in said direction and rotation of said shaft means when said nut means is disengaged with said spindle block will not cause movement of said spindle block, said clamping means including a first clamping element disposed to clamp against the outer surface of said nut means fluid cylinder means including a cylinder member and a piston member, a first of said members being connected to said first clamping element, actuation of said fluid cylinder means moving said first clamping element in a generally radial direction into engagement with the outer surface of said nut means, a second of said members being mounted for sliding movement relative to said block, a second clamping element secured to said second member, and mounting means for mounting said second clamping element for radial movement relative to said block, said fluid cylinder means and said mounting means being disposed in alignment, initial actuation of said fluid cylinder means acting to move said first clamping element into engagement with said nut means and further actuation of said fluid cylinder means acting to move said second member relative to said block to thereby move said second clamping element in a direction toward said first clamping element and into engagement with said nut means to thereby prevent relative movement between said nut means and said block.

11. The apparatus of claim 10, wherein said first member comprises a piston rod and said second member comprises a cylinder to slidably receive said piston rod.

12. The apparatus of claim 11, wherein said second clamping member is annular in shape and surrounds said first clamping element, said second clamping element having a radial opening, said cylinder being secured in said opening.

13. The apparatus of claim 12, wherein said mounting means comprises a pin secured to said second clamping element and slidable within an opening in said block, said pin and said fluid cylinder means located at diametrically opposite positions relative to said nut.

14. The apparatus of claim 10, wherein said nut means includes a nut engaged with said screw means and a plastic jacket disposed around said nut and having a generally cylindrical outer surface, said first and second clamping elements disposed to engage said jacket.

15. The apparatus of claim 10, and including biasing means connected to said second clamping element for biasing said second clamping element out of contact with said nut means on deactivation of said fluid cylinder means.

16. A positioning apparatus for positioning a head of a multiple head working apparatus, comprising a frame, a plurality of spindle blocks mounted in side-by-side relation on the frame, guide means for guiding the spindle blocks in movement on said frame in a given direction, a spindle to carry a working member and connected to each spindle block, means for rotating each spindle about its axis, means for moving each spindle axially relative to the respective block, screw means extending in said direction, nut means associated with each spindle block, each nut means being threadedly engaged with said screw means, an outer plastic jacket secured to each nut. means, said plastic jacket having brake lining charactertics and having a generally cylindrical outer surface, and clamping means for selectively clamping each nut means to the respective spindle block, each clamping means disposed to engage the outer surfce of the respective jacket, whereby rotation of the screw means when the nut means is engaged with the respective spindle block will cause movement of the spindle block in said direction and rotation of said screw means when said nut means is disengaged with said spindle block will not cause movement of said spindle block.

17. The apparatus of claim 16, wherein said clamping means includes a pair of generally curved clamping members, power means for moving a first of said clamping members in a generally radial direction into engagement with the outer surface of said jacket, mounting means for mounting a second of said clamping members for radial movement relative to said block, said power means and said mounting means being disposed in alignment whereby initial actuation of said power means will move said first clamping member into engagement with said jacket and further actuation of said power means will move said power means relative to said block to thereby move said second clamping member in a direction toward said first clamping member to clamp said second clamping member against said nut means and thereby prevent relative movement between said nut means and said block.

18. The apparatus of claim 17, wherein said power means comprises a fluid cylinder and said second clamping member is annular in shape and surrounds said first clamping member, said second clamping member having a radial opening, said fluid cylinder being secured in said opening.

* * * * *

UNITED STATES PATENT AND TRADEMARK OFFICE
CERTIFICATE OF CORRECTION

PATENT NO. : 4,728,229
DATED : March 1, 1988
INVENTOR(S) : LAWRENCE C. MEMMEL ET AL It is certified that error appears in the above-identified patent and that said Letters Patent is hereby corrected as shown below:

Col. 6, Line 41, CLAIM 1, After "axis" and before "means" insert ---,---(comma); Col. 5, Line 68, CLAIM 6, Cancel "clamp" and substitute therefor ---clamping---; Col. 7, line 4, CLAIM 6, Cancel "clamping" and substitute therefor ---clamp---; Col. 7, Line 41, CLAIM 10, After "means", first occurrence, insert ---,--- (comma)

Signed and Sealed this

Twenty-ninth Day of November, 1988

Attest:

DONALD J. QUIGG

Attesting Officer

Commissioner of Patents and Trademarks